Patented Oct. 11, 1932

1,881,893

UNITED STATES PATENT OFFICE

ANTHONY F. OLIVER AND ROBERT C. PALMER, OF PENSACOLA, FLORIDA, ASSIGNORS, BY MESNE ASSIGNMENTS, TO NEWPORT INDUSTRIES, INCORPORATED, A CORPORATION OF DELAWARE

PROCESS OF PURIFYING RESINS

No Drawing. Application filed December 16, 1929. Serial No. 414,601.

This invention relates to a process of purifying resins contaminated with iron impurities.

The dark coloration of resins is frequently due to the presence of pigmented metallic impurities, particularly iron. Even a small amount of iron impurities greatly depreciates the commercial value of the resin.

It is therefore an important object of this invention to provide a process of decolorizing resins containing pigmented metallic impurities.

It is a further important object of this invention to provide a process for removing iron impurities from resins and more particularly gum and wood rosins contaminated therewith.

Other and further important objects of this invention will become apparent from the following description and appended claims.

By the term "resins" as herein used, it is meant to include natural resins, such as gum and wood rosins, or fossil resins, and synthetic resins such as ester gum, phenol-rosin resins and the like. The two principal sources of rosin are the living pine trees from which there exude oleoresins, and "lightwood" consisting of the stumps and limbs of the pine trees, from which the rosin may be extracted by means of a solvent. From both of these sources the resinous matter may come in contact with iron or like impurities, which due to the acidic nature of the resins may enter into chemical combinations that result in giving the recovered resin a dark color. As little as 0.1% iron will darken a pale grade of rosin to such an extent that it must be classed as the lowest merchantable grade.

We have now discovered that iron impurities may be converted into a substantially colorless form by a simple chemical treatment that may be applied during the ordinary course of recovering rosin or any particular resin. We have also discovered that by a further simple step the iron impurities may be removed, if desired, with resulting improvement in the quality of the recovered rosin. It is thus possible by our process either to render the iron impurities colorless or to remove them entirely, the quality of the recovered rosins being greatly improved by either the first procedure alone or by the combined steps.

Our invention comprises treating a resin contaminated with iron impurities with a relatively small amount of an organic acid whose iron salt is colorless and soluble in the resin. Thus, oxalic acid appears to combine with the iron impurities to form a substantially colorless compound soluble in rosin. It is probable that the iron impurities, due to the reducing action of oxalic acid, are converted into ferrous oxalate. We have further discovered that the almost colorless ferrous oxalate formed is insoluble in the organic solvents which are commonly used as solvents for rosins, such for instance as alcohols, di-isobutylene, benzene and light petroleum fractions, such as petroleum solvent naphtha and gasoline.

Our invention as applied to the decolorization of gum oleoresin, or rosin recovered therefrom, is best illustrated by the following example of our preferred method, although it will be obvious that the procedure may be varied as to the order of steps without departing from the principles of our invention.

Example

The oleoresin as recovered from "dipping" or "scraping" operations in the woods usually contains considerable water, pine chips, pine needles, clay and other impurities which should first be removed.

A convenient method is to warm the mass until it becomes sufficiently liquid to permit filtration. Another procedure is to emulsify the mass with sufficient added water to render it liquid enough to permit the chips, pine, straw, and the like, to be filtered off.

After the mass has been freed from such impurities, it is placed in a still and the water and turpentine contained in the resin are distilled off. The rosin remains as a liquid residue in the still, usually at a temperature of around 150° C. All of the foregoing steps are those commonly practiced in the manufacture of gum rosin.

Oxalic acid is now added to the hot liquid mass of rosin in the still in an amount depending upon the apparent iron impurities content of the rosin. The amount of oxalic acid added may vary between 0.05 and 0.3% by weight of the rosin. An occasional, very badly contaminated rosin might require more than .3%, say 1%, but the average amount of oxalic acid required will lie within the range given. After the addition of the oxalic acid, the mass is preferably agitated, as for example by blowing steam into the mass, until the reaction and color change is completed.

The decolorized rosin may then be drawn into shipping containers.

If it is desired to remove the compound formed by the reaction between the metallic impurities and the oxalic acid, the rosin is dissolved in petroleum naphtha, say to a 20% concentration of rosin, and the solution cooled. After being allowed to settle, the rosin solution is decanted from the insoluble matter comprising the ferrous oxalate or other compounds of the metallic impurities with oxalic acid. The purified rosin is then recovered from the solution by evaporating off the solvent, or the solution may be further treated to remove organic coloring matters by any desired method before the final recovery of the purified rosin.

As a variation in the above procedure, the steps of adding the oxalic acid and removing the naphtha insoluble ferrous oxalate may be combined, since the decolorization of the rosin also takes place readily when the rosin is in solution in a large volume of naphtha. If this method be used, the rosin solution is preferably heated to its boiling point with the oxalic acid present.

In the removal of iron impurities from wood rosin, the oxalic acid is most conveniently added to the rosin while it is in the form of a rosin solution, such as the solution resulting from the solvent extraction process or a solution formed as a step in the purification of wood rosin to obtain light colored products.

The oxalic acid is added to the hot rosin solution and after cooling, the rosin solution is decanted from the precipitated impurities containing the insoluble iron compound of oxalic acid. The rosin may then be recovered from solution by evaporation of the solvent in the usual manner.

If during some process of purification, rosin is at one stage of the process in a fused condition, it is very convenient to apply the oxalic acid treatment at such stage, but if at some later stage in the process, the rosin is to be dissolved in a common rosin solvent, it may be more advantageous to reserve the oxalic acid treatment for such later stage. If, however, the rosin is later to be redissolved in petroleum naphtha for subjecting it to further purification, we find it more advantageous to subject the rosin to the oxalic acid treatment before said further purification rather than after.

In applying our process to ester gum, or other synthetic gum, the procedure is the same as in the above example, except that the preliminary steps of treating to remove foreign matter, such as pine needles and the like, and of distilling to remove water and turpentine, are here totally absent.

Although we have herein referred specifically to the use of petroleum solvent naphtha as the preferred solvent, this is simply because solvent naphtha is most commonly employed commercially on account of its economical aspects and general adaptability. Our process, however, is not limited to the use of this solvent, but includes other organic solvents which are non-solvents for ferrous oxalate while at the same time being solvents for rosin.

Citric acid may be substituted for the oxalic acid referred to in the foregoing description but where citric acid is used, the color is not so completely eliminated as it is by the use of oxalic acid.

The term "rosin in liquid phase", as used in the claims, is meant to include rosin either in a molten state or in solution.

We are aware that numerous details of the process may be varied through a wide range without departing from the principles of this invention, and we, therefore, do not purpose limiting the patent granted hereon otherwise than necessitated by the prior art.

We claim as our invention:

1. The process of decolorizing a resin contaminated with iron impurities, which comprises treating such resin in liquid phase with oxalic acid.

2. The process of decolorizing rosin containing iron impurities, which comprises treating such rosin in liquid phase with oxalic acid.

3. In the process of eliminating iron impurities from rosin, the steps which comprise mixing oxalic acid with such rosin and dissolving the mixture in a common rosin solvent.

4. In the process of decolorizing rosin containing iron impurities, the step of treating a fused mass of such rosin with oxalic acid.

5. The process of removing iron impurities from rosin contaminated therewith, which comprises treating a fused mass of such rosin with oxalic acid, dissolving the rosin in a solvent for the rosin but not for the said impurities and separating the said insoluble impurities from the rosin solution.

6. In the process of decolorizing rosin contaminated with iron impurities, the steps which comprise treating such rosin with oxalic acid to form ferrous oxalate and heating the mixture of rosin and ferrous oxalate in a relatively large volume of a light petroleum fraction.

7. The process of removing iron impurities from rosin contaminated therewith, which comprises heating a solution of such rosin in the presence of oxalic acid, whereby an insoluble iron oxalate is formed, and seperating said insoluble compound from said rosin solution.

8. The process of removing iron impurities from gum rosin contaminated therewith, which comprises treating a fused mass of such gum rosin at an elevated temperature with oxalic acid, dissolving said rosin in a common rosin solvent and separating from the rosin solution the compounds insoluble therein comprising the iron impurities.

9. The process of removing iron impurities from gum rosin contaminated therewith, which comprises adding to a fused mass of such rosin from 0.05 to 1% by weight of oxalic acid, agitating the mixture, dissolving the mixture in petroleum naphtha to about a 20% rosin concentration, cooling and removing the precipitate formed.

10. The process of freeing rosin from iron impurities, which comprises dissolving such rosin in a light petroleum fraction, adding thereto oxalic acid and separating the precipitate formed from the rosin solution.

11. The process of freeing gum rosin from iron impurities, which comprises treating a solution of gum rosin at an elevated temperature with oxalic acid and separating the precipitate thus formed.

12. The method for removing pigmented metallic bodies including iron from resin which includes contacting resin with oxalic acid.

13. The method for removing pigmented metallic bodies including iron from resin which includes extracting resin in solution in a solvent therefor with oxalic acid.

In testimony whereof, we have hereunto subscribed our names at Pensacola, Escambia County, Florida.

ANTHONY F. OLIVER.
ROBERT C. PALMER.